B. L. HENRY.
ICE CREAM FREEZER.
APPLICATION FILED SEPT. 28, 1911.
1,037,762.
Patented Sept. 3, 1912.
2 SHEETS—SHEET 1.
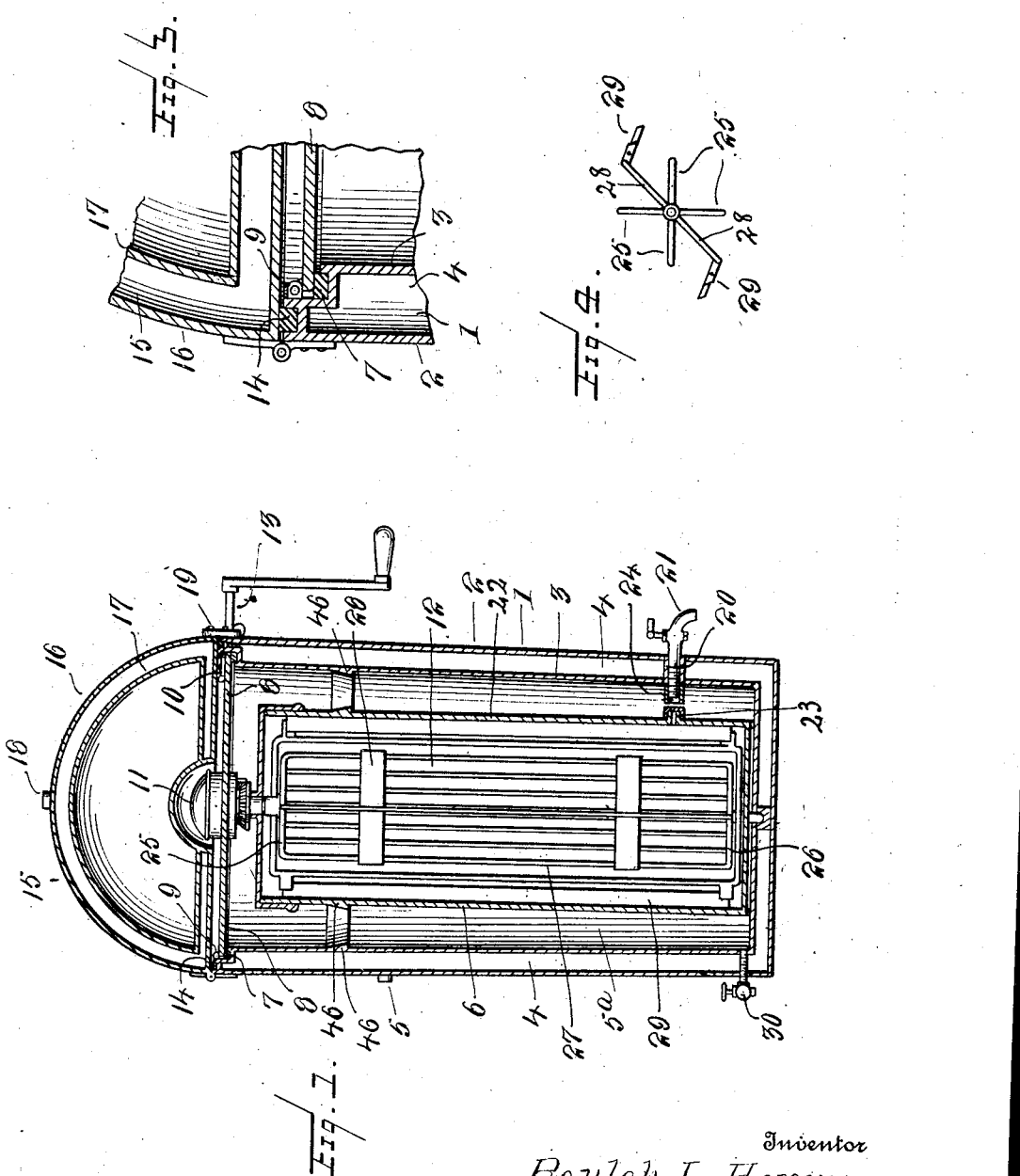
Witnesses
Inventor
Beulah L. Henry
By Victor J. Evans
Attorney

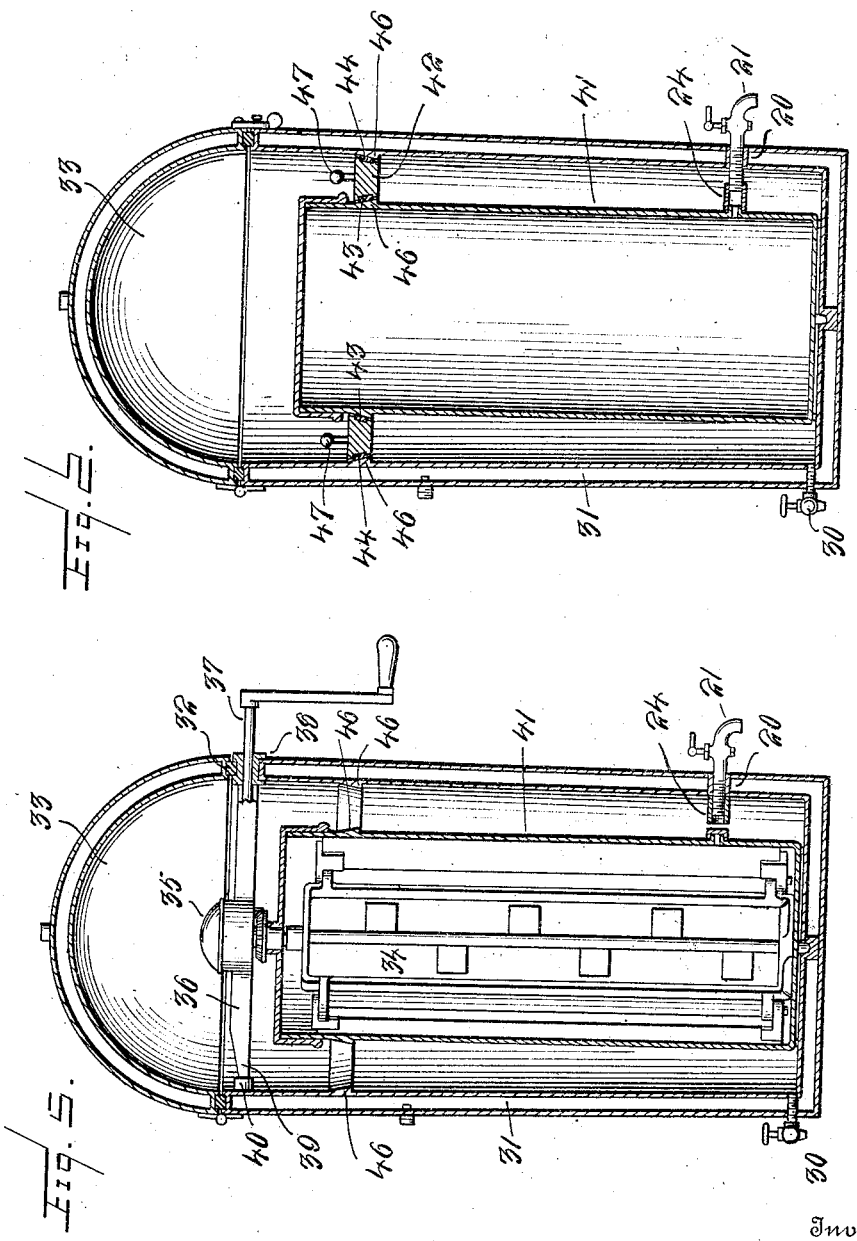

UNITED STATES PATENT OFFICE.

BEULAH L. HENRY, OF CHARLOTTE, NORTH CAROLINA, ASSIGNOR OF ONE-HALF TO WILLIAM THOMAS WOODLEY, OF CHARLOTTE, NORTH CAROLINA.

ICE-CREAM FREEZER.

1,037,762.  Specification of Letters Patent.  Patented Sept. 3, 1912.

Application filed September 28, 1911. Serial No. 651,721.

*To all whom it may concern:*

Be it known that I, BEULAH L. HENRY, a citizen of the United States, residing at Charlotte, in the county of Mecklenburg and State of North Carolina, have invented new and useful Improvements in Ice-Cream Freezers, of which the following is a specification.

This invention relates to ice cream freezers, and has for an object to provide a freezer which will include a freezing chamber surrounded by an insulating walled structure so that a freezing temperature in the freezing chamber can be effectively retained to effect a rapid freezing of the cream with a minimum expenditure of ice.

Another object of the invention is to provide a freezer that can be readily and effectively used as a water cooler.

In the drawing, forming a portion of this specification and in which like numerals of reference indicate similar parts in the several views:—Figure 1 is a vertical section through the freezer. Fig. 2 is a similar view showing the device in use as a water cooler. Fig. 3 is a section on an enlarged scale through the upper portion of the freezer. Fig. 4 is a top plan view of the dasher. Fig. 5 is a view similar to Fig. 1 showing a slightly modified form of the invention.

The freezer comprises an outer vessel 1 which includes the walls 2 and 3 spaced apart so as to form an intervening vacuum space 4, the wall 2 being provided therein with a plug or valve 5 whereby the air may be exhausted from the space between the said wall 2 and the adjacent wall 3. The freezing chamber 5ᵃ of the receptacle 1 has mounted therein a freezing can 6 for the reception of the cream to be frozen. The walls of the can are spaced vertically from the walls 3 so that ice or water at a very low temperature can be placed in the freezing chamber to entirely surround the can.

The vessel 1 is provided at its upper end with a gasket 7 against which the top member 8 is adapted to bear. This member is hinged, at 9, to the vessel 1 and is adapted to be securely held in a closed position on the vessel by the clamp 10. The member 8 is provided with the mechanism 11 which may be of any suitable well known construction, the purpose of the mechanism being to drive the dasher 12 of the freezer. The mechanism includes a crank shaft 13 which may be operated either manually or by motor power. The construction as described is such that air from the outside will be positively excluded from the freezing chamber so that a very low temperature can be established in the chamber to effect a rapid freezing of the cream. The vessel 1 is also provided with a gasket 14 and against this gasket is adapted to be fitted the lower portion of a substantially dome-shaped cover member 15. This member includes the spaced walls 16 and 17 and the valve or plug 18, whereby the air may be exhausted from the space between the walls to form therebetween a vacuum. The cover member may be secured to the receptacle 1 by the clamp 19.

A short pipe 20 extends through the receptacle 1 adjacent to the lower end thereof. This pipe is provided exteriorly of the receptacle with a draw-off valve 21. The water receptacle 22 in this form of the invention is provided with a nipple 23 which may be connected to the pipe 20 by the coupling 24. Water may be placed in the receptacle 22 and the ice may be placed around the receptacle to effectively cool the same as will be understood.

The dasher 12 preferably comprises a frame member having the upper radial arms 25 and lower similar radial arms 26, the said upper and lower arms being connected with each other by the vertical agitating rods 27. The dasher also includes the radial blades 28 and the scraping members 29. The chamber 5ᵃ is provided with a suitable draw-off cock 30, whereby the waste water can be drawn from said chamber.

In the modified form of the invention shown in Fig. 5, the receptacle 31 is substantially identical with that described in the preferred form of the invention. The top of the receptacle is provided with a gasket 32 against which the cover member 33 is adapted to bear. The dasher 34 is driven by the actuating mechanism 35 which includes a support 36 and the controlling shaft 37, the latter being mounted in the former and in a bearing member 38. This bearing member embraces one end of the shaft 37, and as illustrated, it is removably fitted to the upper end of the receptacle 31. The support 36 is provided with a reduced end 39 which is removably fitted in the socket member 40 which extends inwardly from the receptacle 31. This construction is such that the dasher operating mechanism can be readily removed from the freezer when it is desired to lift the freezing vessel 41 from the vacuum walled vessel.

When the device is used as a storing receptacle it is desirable, for the purpose of excluding the outside air from the ice chamber, to provide a plug or cover 42 such as shown in Fig. 2 of the drawings. This plug is of ring form and its external and internal surfaces are beveled and provided with gaskets 43 and 44 respectively to fit against the beveled surfaces 45 and 46 respectively, on the vacuum walled vessel and freezing can respectively. The plug or cover is provided with suitable handles 47, whereby the cover can be readily lifted from the device when desired. From the construction it will be seen that the air will positively be excluded from entering the refrigerant chamber when the cover of the vacuum walled vessel is open for the purpose of removing the ice cream from the vessel 41.

I claim:—

1. In an ice cream freezer, an insulated vessel, an insulated cover therefor, inner and outer gaskets disposed in different planes upon the upper end of the vessel, a freezing can removably mounted in the vessel and including a dasher, a member hinged to the vessel and adapted to close against the inner gasket, dasher operating means on said member, and an insulated cover hingedly mounted on the vessel and adapted to be closed against said outer gasket.

2. An insulated vessel, an insulated cover therefor, a can removably mounted in said vessel and provided adjacent to its upper end with an exteriorly disposed annular beveled surface, the inner wall of the vessel being provided with an annular beveled surface disposed immediately opposite the first beveled surface, a cover for the vessel, and an annular plug removably fitting between the vessel and the can and provided with internal and external beveled surfaces adapted for frictional contact with the first and second named beveled surfaces to effect an air tight connection between the can and the vessel when the cover of the vessel is open.

In testimony whereof I affix my signature in presence of two witnesses.

BEULAH L. HENRY.

Witnesses:
G. A. SMITH,
C. H. ROBINSON.

---

Copies of this patent may be obtained for five cents each, by addressing the "Commissioner of Patents, Washington, D. C."